United States Patent [19]
Mealey et al.

[11] Patent Number: 5,933,631
[45] Date of Patent: Aug. 3, 1999

[54] DYNAMIC BOOT FILESYSTEM SELECTION

[75] Inventors: Bruce Gerard Mealey, Austin; Randal Craig Swanberg, Round Rock; Michael Stephen Williams, Austin, all of Tex.

[73] Assignee: International Business Machines Corporation, Armonk, N.Y.

[21] Appl. No.: 08/819,160

[22] Filed: Mar. 17, 1997

[51] Int. Cl.[6] .................................................. G06F 9/445
[52] U.S. Cl. ............................................................ 395/652
[58] Field of Search ............................................. 395/652

[56] References Cited

U.S. PATENT DOCUMENTS

| | | | |
|---|---|---|---|
| 5,325,532 | 6/1994 | Crosswy et al. | 395/652 |
| 5,379,431 | 1/1995 | Lemon et al. | 395/652 X |
| 5,386,561 | 1/1995 | Huynh et al. | |
| 5,394,547 | 2/1995 | Correnti et al. | |
| 5,497,492 | 3/1996 | Zbikowski et al. | 395/652 |
| 5,586,327 | 12/1996 | Bealkowski et al. | 395/652 |
| 5,675,795 | 10/1997 | Rawson, III et al. | 395/652 |
| 5,715,456 | 2/1998 | Bennett et al. | 395/652 |

Primary Examiner—Thomas M. Heckler
Attorney, Agent, or Firm—Richard A. Henkler; Jack V. Musgrove; Andrew J. Dillon

[57] ABSTRACT

A method of providing a dynamic abstraction layer, such as a boot filesystem, for a computer having a particular hardware platform, in order to make a basic operating system more portable. The method includes storing the dynamic boot filesystem in a protected space in the computer before the normal boot sequence, and then retrieving the dynamic boot filesystem from the protected space during the boot sequence and loading the retrieved dynamic boot filesystem. The computer firmware first loads a simulated boot image which contains the dynamic boot filesystem, and then loads an operating system boot image which contains the operating system and instructions for retrieving the dynamic boot filesystem. A default boot filesystem may be used if no previously stored dynamic boot filesystem is found. In a UNIX embodiment, the dynamic boot filesystem includes a hardware-dependent PAL (Portable Assist Layer). The two boot images can be provided on a single media which is scanned twice, or separate media, for example, a floppy diskette and a CD-ROM disk.

19 Claims, 3 Drawing Sheets

DYNAMIC BOOT FILESYSTEM SELECTION

BACKGROUND OF THE INVENTION

1. Field of the Invention

The present invention generally relates to computers, and more particularly to a method of installing a computer operating system on one of a variety of hardware platforms. The method involves loading of a dynamic boot filesystem prior to loading of the computer operating system (boot image), and then retrieving the dynamic boot filesystem during installation of the operating system.

2. Description of the Prior Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor.

Computer system 10 also includes firmware 24 whose primary purpose is to seek out and load an operating system from one of the peripherals (usually permanent memory device 16) whenever the computer is first turned on. The process of seeking out and loading the operating system is referred to as "booting" the computer. Computer system 10 may be designed to allow firmware 24 to re-initialize an operating system without turning the computer off and back on again (a "soft" boot). Firmware 24 is essentially a series of machine instructions which are typically stored in a read only storage (ROS) device, such as read only memory (ROM). As shown in the flow chart of FIG. 2, after power to computer system 10 is turned on (26), processor 12 begins to execute the firmware instructions and seeks out an operating system (28). If an operating system is found, it is loaded (30) into temporary memory 18. Thereafter, the operating system allows other application layers to be added, i.e., user software programs (32). The boot sequence is essentially steps 28 and 30. In this manner, a given computer hardware construction can be adapted to run a variety of operating systems.

The foregoing description generally applies to any type of operating system, including two popular operating systems known as MSDOS and UNIX (MSDOS is a trademark of Microsoft Corp.; UNIX is a trademark of UNIX System Laboratories), but the present invention has particular application to UNIX. UNIX is a multi-user, multi-tasking operating system which is available from a variety of sources with different versions. These include, among others, System V (American Telephone & Telegraph), AIX (International Business Machines) and Mach (NeXT Computers). FIG. 3 illustrates a typical boot image 34 that is loaded as a UNIX operating system. Boot image 34 includes a base kernel portion 36 and a boot filesystem portion 38. Kernel 36 acts as the intermediary between user programs and hardware devices, and includes, among other things, device drivers. Boot filesystem 38 is the RAM-based file system that provides user commands to manipulate computer objects, such as files, directories and symbolic links. Boot filesystem 38 can also contain loadable device drivers and other platform-specific loadable kernel extensions. When firmware 24 sees boot image 34 (such as on a floppy diskette, hard disk or CD-ROM disk), it transfers control to that operating system (kernel 36) after loading boot image 34.

A given operating system can be adapted to run on various types of hardware platforms. With some operating systems, such as MSDOS, the operating system is fairly independent of the hardware platform, i.e., a given copy of the MSDOS operating system can be used to boot computers manufactured by many sources, since the hardware architecture and BIOS (basic input and output system) functions remain constant from manufacturer to manufacturer. Other operating systems, like UNIX, are less portable due to significant differences between the various types of hardware that have been designed to run UNIX. In this regard, boot filesystem 38 includes information that is hardware dependent, such as the PAL (Portability Assist Layer, or Platform Abstraction Layer), which contains the specific instructions for communicating with the particular hardware devices of a given manufacturer.

This hardware dependence makes marketing of the operating system more difficult since different versions must generally be provided for each UNIX workstation manufacturer. One prior art method of overcoming this difficulty is to provide multiple PALs (one for each manufacturer), i.e., multiple boot filesystems as indicated at 40, 42. Alternatively, a single, huge boot filesystem could be provided, containing support for multiple platforms. While these approaches allow a single boot image to be distributed for use with any workstation, they are undesirable in that the boot image is much larger than necessary (because it contains all the unused PALs) and so takes up more system resources. They also fail to accommodate new hardware platforms, i.e., those that are designed after the release of the operating system. It would, therefore, be desirable to provide an operating system which is easily loaded on different hardware platforms without requiring multiple RAM-based boot filesystems, and it would be further advantageous if the method of installing the operating system allowed for simple incorporation of new hardware platforms.

SUMMARY OF THE INVENTION

It is therefore one object of the present invention to provide a computer operating system which is easily installed on different hardware platforms.

It is another object of the present invention to provide such an operating system which dynamically loads a boot filesystem so as to not require the provision of multiple boot filesystems for each hardware platform.

It is yet another object of the present invention to provide a method of installing such an operating system which is easily adapted for new hardware platforms designed after the release of the operating system.

The foregoing objects are achieved in a method of providing a dynamic boot filesystem for a computer, generally comprising the steps of storing the dynamic boot filesystem in a protected space in the computer before a boot sequence, retrieving the dynamic boot filesystem from the protected space during the boot sequence, and thereafter loading the operating system with the retrieved dynamic boot filesystem. The computer has firmware for seeking and loading an operating system from a peripheral device connected to the computer. The firmware first loads a simulated boot image which contains the dynamic boot filesystem, and then loads an operating system boot-image which contains the operating system and instructions for retrieving the dynamic boot filesystem. The protected space is, e.g., RAM, and control information may also be provided which indicates the location and size of the dynamic boot filesystem within RAM. If for some reason the operating system boot image does not find a previously stored dynamic boot filesystem, then a default (static) boot filesystem may instead be loaded. In the embodiment wherein the operating system is a UNIX type operating system, the dynamic boot filesystem may include a hardware-dependent PAL (Portable Assist Layer). The two boot images can be provided on separate media, for example, a floppy diskette and a CD-ROM disk, imparting greater flexibility since a single CD-ROM disk can be used with customized floppy diskettes provided for each hardware platform, including platforms designed after creation of the CD-ROM disk.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Figure 1:
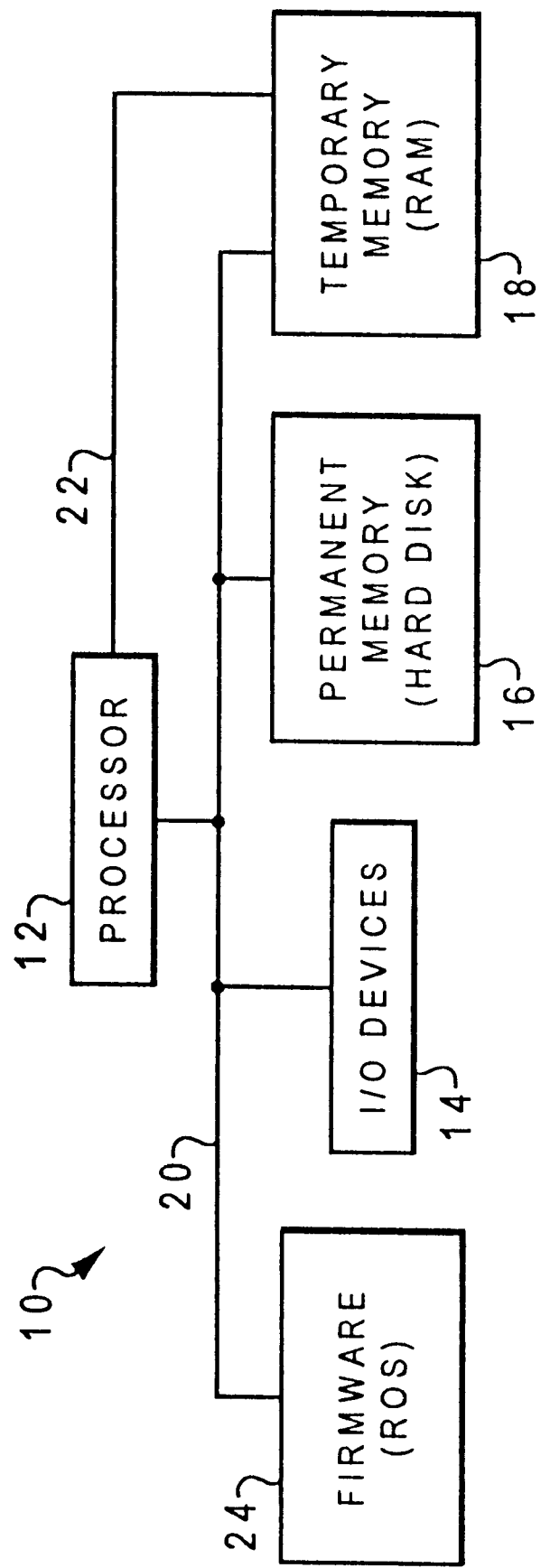
FIG. 1 is a block diagram of a conventional computer system.
Figure 2:
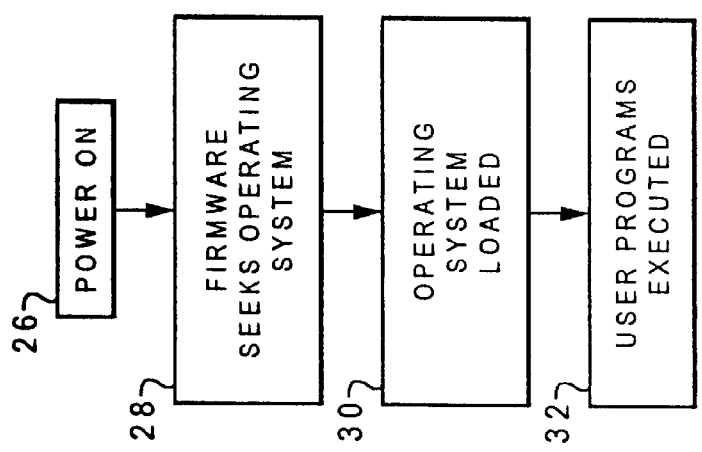
FIG. 2 is a flow chart depicting the basic boot sequence of a conventional operating system.
Figure 3:
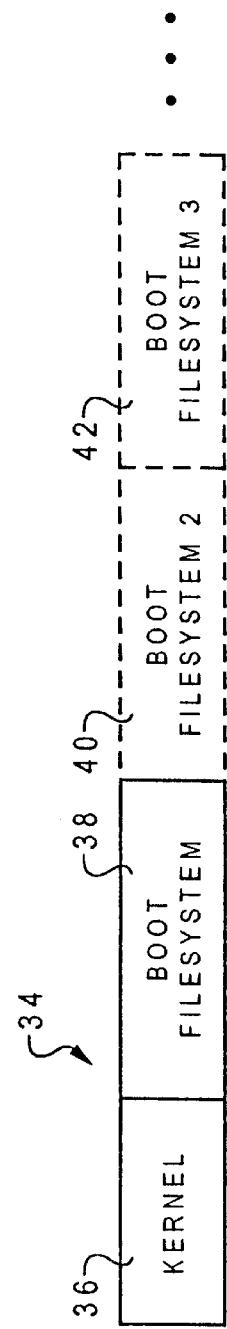
FIG. 3 is a representation of a prior art UNIX boot image.
Figure 4:
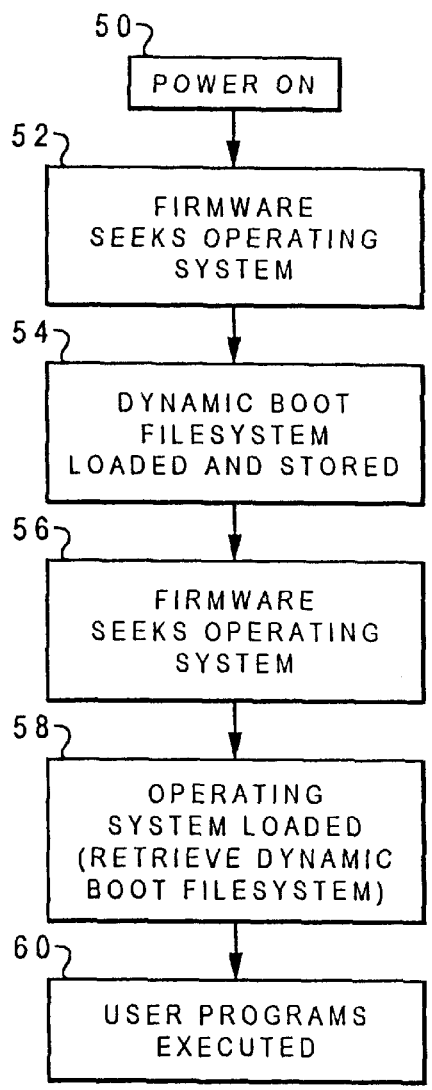
FIG. 4 is a flow chart depicting the basic boot sequence according to the present invention.
Figure 5:
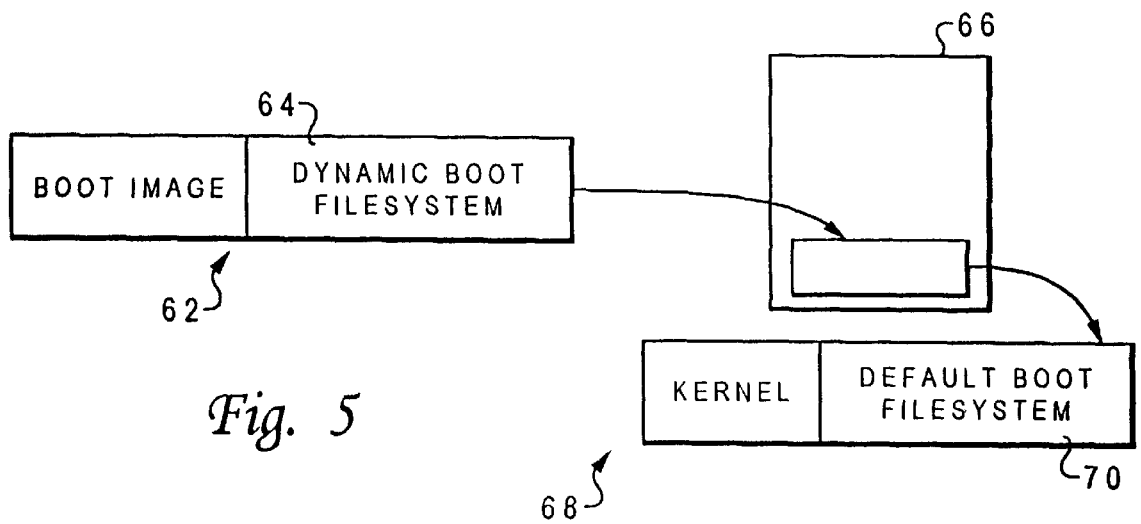
FIG. 5 is a representation of the dynamic boot filesystem which is loaded and retrieved later in the boot sequence according to the present invention.

With reference now to FIGS. 4 and 5, there is depicted the novel method of the present invention by which a dynamic boot filesystem for a computer operating system is provided whose contents are specific to the particular hardware to be supported by the operating system. The chart of FIG. 4 depicts the general process flow, beginning when power to the computer is turned on (50), although this step could also refer to a soft boot command. After power is turned on (or the boot process is otherwise initiated), the firmware seeks an operating system (52), similar to the initial step of the prior art flow (step 28 of FIG. 2). In the present invention, however, the operating system is not actually loaded by the firmware at this time. Rather, a simulated boot image is loaded which contains a dynamic boot filesystem, and this filesystem is then temporarily stored (54) for later retrieval by the real operating system. Thereafter, control is returned to the firmware which again seeks an operating system (56) and, when found, the operating system retrieves the previously stored dynamic boot filesystem (58). The dynamic boot filesystem contains all components and instructions needed to complete the operating system initialization and configuration. Computer operation is then passed to user applications (60).

One example of how this method might be implemented for a specific operating system is shown in FIG. 5, which pertains to a UNIX type operating system, such as AIX. A simulated boot image 62 is provided which contains operating system specific platform support code, i.e., boot image 62 includes the dynamic boot filesystem 64. Dynamic boot filesystem 64 is a hardware-specific program (code) which is pre-selected based on the particular hardware platform that is to load the AIX operating system, e.g., dynamic boot filesystem 64 could be adapted for use with IBM's RS/6000 computer. The firmware contains appropriate instructions which store dynamic boot filesystem 64 in a protected area 66, such as a portion of RAM which is not used during the earliest steps of the boot sequence. If necessary, that portion of RAM can be marked with appropriate control information to allow the operating system to later identify where and how big the image is.

After dynamic boot filesystem 64 has been safely stored in the protected space 66, the firmware then continues looking for a "normal" boot image, such as operating system (OS) boot image 68, to load transfer control to. OS boot image 68 is "normal" in the sense that it contains all the necessary program code to completely load the operating system (i.e., it is not just a shell like simulated boot image 62), but OS boot image 68 is not conventional since it must include instructions for retrieving the previously stored dynamic boot filesystem 64. When the operating system receives control, it looks at the boot information left by firmware (e.g., in the form of control information discussed above) and sees that a dynamic boot filesystem was loaded. The operating system does not care which particular dynamic boot filesystem is present, i.e., it is adapted to retrieve any one of a number of dynamic boot filesystems. The operating system then retrieves the dynamic boot filesystem, replacing a static or default boot filesystem 70 that was bound into boot image 68. In this manner, the operating system has access to loadable, hardware-specific kernel extensions and device drivers that may be specific to a new or OEM-provided hardware platform, without a re-generation of the base kernel or installation media. Static boot filesystem 70 is optional, i.e., it does not need to be present as long as a dynamic boot filesystem is found, but it is preferable to provide a default boot filesystem.

As an alternative to the firmware recognizing the special signature of simulated boot image 62 and loading the dynamic boot filesystem, the simulated boot image could itself have appropriate instructions to take control over from the firmware, i.e., the simulated boot image can load the dynamic boot filesystem. Thereafter, the simulated boot image can release control back to the firmware which goes on to find the real operating system. In either approach, the firmware recognizes and loads two images.

The foregoing method could be physically implemented by the user in a number of ways. In one particularly advantageous implementation, a single version of an operating system (such as AIX) is provided on a first media, such as a CD-ROM disk, with a separate media, such as a floppy diskette, storing the dynamic boot filesystem. The user would first insert the floppy diskette into the floppy drive of the computer, and turn on power to the computer system (or enter a soft boot command). When the firmware seeks an operating system, it will find the simulated boot image on the floppy diskette, and then temporarily store the dynamic boot filesystem. The simulated boot image will then return control to the firmware, but only after an appropriate user signal (such as striking a key on the keyboard), to allow the user to remove the floppy diskette and insert the CD-ROM disk into the CD-ROM drive of the computer. When the user signal is given, the firmware again seeks an operating system, and finds and loads the OS boot image on the CD-ROM, which proceeds to install the dynamic boot filesystem. This implementation greatly simplifies packaging, marketing and installation, since a single CD-ROM disk can be provided with the basic operating system, and customized floppy diskettes can be provided for each hardware platform, including hardware platforms that are conceived after creation of the CD-ROM disk.

The foregoing is but one example of how the present invention could be implemented, but there are many other variations. Two different floppy diskettes (instead of a floppy and a CD-ROM) could be used to store the simulated and OS boot images. Both of the boot images could even be on the same floppy, but this would require dynamic modification of the disk: the simulated boot image is originally provided at the boot sector of the floppy diskette, but after the simulated boot image has been loaded (and the dynamic boot filesystem stored), the disk is re-written to place the OS boot image at the boot sector. Other input devices could be used, such as a serial port connection. Another variation provides for multiple dynamic boot filesystems in the simulated boot image which are all loaded into protected space (i.e., all of the dynamic boot filesystems are provided on a single floppy diskette), and then the boot sequence (from the OS boot image on a CD-ROM) could prompt the user for further information in selecting the appropriate dynamic boot filesystem out of the choices present in the protected space.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the invention is not limited to UNIX type operating systems, but can be applied to any operating system which has software components that are hardware specific, so as to not have to provide a multitude of components that unnecessarily take up extensive resources. It is therefore contemplated that such modifications can be made without departing from the spirit or scope of the present invention as defined in the appended claims.

We claim:

1. A method of providing a dynamic boot filesystem for a computer which supports an operating system that is loaded onto the computer by a boot sequence using firmware, comprising the steps of:

loading a first boot image which contains a dynamic boot filesystem, using the computer's firmware;

storing the dynamic boot filesystem in a protected space in the computer before a boot sequence;

loading a second boot image which contains the operating system, using the computer's firmware, after said storing step;

loading the operating system; and retrieving the dynamic boot filesystem from the protected space during the boot sequence.

2. The method of claim 1 wherein:

the computer has a temporary memory device, and the protected space is created by defining a portion of the temporary memory device.

3. The method of claim 1 further comprising the step of loading the operating system with a default boot filesystem if the dynamic boot filesystem cannot be retrieved.

4. The method of claim 1 further comprising the step of loading the dynamic boot filesystem.

5. The method of claim 1 wherein:

the operating system is a UNIX type operating system; and said loading of the operating system step includes the step of loading a hardware-dependent PAL in the dynamic boot filesystem.

6. The method of claim 1 wherein said loading of the operating system step includes the step of loading hardware-dependent device drivers.

7. The method of claim 1 further comprising the step of. storing control information identifying the location of the stored dynamic boot filesystem.

8. The method of claim 1 wherein the first and second boot images are provided on a single media which is scanned twice.

9. The method of claim 1 wherein the first boot image contains instructions which release control of the computer back to the firmware after storing the dynamic boot filesystem in the protected space.

10. The method of claim 1 wherein the second boot image contains instructions which retrieve the dynamic boot filesystem from the protected space during the boot sequence.

11. The method of claim 1 wherein:

the first boot image is provided on a first media; and the second boot image is provided on a second media separate from the first media.

12. The method of claim 11 wherein the first and second media must be sequentially inserted into one or more input devices connected to the computer, and further comprising the step of delaying said retrieving and loading of the operating system steps until a user signal is given to indicate that the first media has been removed from the input device and the second media has been inserted into the input device.

13. The method of claim 11 wherein:

the first and second media are placed into two separate input devices; and the firmware automatically seeks the second boot image after the first boot image has been loaded.

14. A device for loading an operating system, comprising:

a processor;

a memory device connected to said processor;

one or more input devices connected to said processor;

firmware means connected to said processor for seeking a boot image and loading an operating system in said memory device;

media adapted to be read by at least one of said input devices, having a first boot image containing a dynamic boot filesystem and instructions for (i) storing said dynamic boot filesystem in said memory device and (ii) thereafter returning control to said firmware means, and having a second boot image containing said operating system and instructions for retrieving said stored dynamic boot filesystem.

15. The device of claim 14 wherein said second boot image further contains a default boot filesystem and instructions for loading said default boot filesystem if said dynamic boot filesystem cannot be retrieved.

16. The device of claim 14 wherein:

said operating system is a UNIX type operating system; and said second boot image further contains a hardware-dependent PAL in said dynamic boot filesystem.

17. The device of claim 14 wherein the second boot image further contains hardware-dependent device drivers.

18. The device of claim 14 wherein said first boot image further contains instructions for storing control information in said memory device which identifies a location of said stored dynamic boot filesystem.

19. The device of claim 14 wherein said media includes:

a first media having said first boot image; and a second media separate from said first media, having said second boot image.

\* \* \* \* \*

UNITED STATES PATENT AND TRADEMARK OFFICE
CERTIFICATE OF CORRECTION

PATENT NO. : 5,933,631
DATED : August 3, 1999
INVENTOR(S) : Mealey, et al.

It is certified that error appears in the above-identified patent and that said Letters Patent is hereby corrected as shown below:

Column 4, Line 26 after "load" insert --and--

Column 6, Line 15 and 16 delete "of the operating system"; and

Column 6, Line 18 delete ".".

Signed and Sealed this

Seventh Day of March, 2000

Attest:

Q. TODD DICKINSON

Attesting Officer

Commissioner of Patents and Trademarks